United States Patent [19]

Sjöström et al.

[11] Patent Number: 4,468,838
[45] Date of Patent: Sep. 4, 1984

[54] BIRD CUTTING PLANT

[75] Inventors: Stig Sjöström; Allan Thörnqvist, both of Nybro, Sweden

[73] Assignee: Meyn Machinenfabriek, B.V., Oostzaan, Netherlands

[21] Appl. No.: 355,581

[22] PCT Filed: Jun. 24, 1981

[86] PCT No.: PCT/SE81/00186
§ 371 Date: Feb. 22, 1982
§ 102(e) Date: Feb. 22, 1982

[87] PCT Pub. No.: WO82/00001
PCT Pub. Date: Jan. 7, 1982

[30] Foreign Application Priority Data

Jun. 24, 1980 [SE] Sweden ................ 8004639

[51] Int. Cl.³ ............................ A22C 21/00
[52] U.S. Cl. ............................ 17/11; 17/52
[58] Field of Search .......... 17/11, 44.1, 52, 1 R

[56] References Cited

U.S. PATENT DOCUMENTS

| 3,639,945 | 2/1972 | Duncan et al. | 17/11 |
| 3,708,829 | 1/1973 | Klevgard | 17/11 |
| 3,778,867 | 12/1973 | Sindler et al. | 17/11 |
| 3,837,045 | 9/1974 | Blacker | 17/11 |
| 3,943,600 | 3/1976 | Cramer | 17/11 |
| 4,019,223 | 4/1977 | Baker | 17/11 |
| 4,071,924 | 2/1978 | Meyn | 17/44.1 X |
| 4,251,901 | 2/1981 | Thomas | 17/11 X |

FOREIGN PATENT DOCUMENTS 7901063 8/1980 Netherlands ................ 17/11

Primary Examiner—Willie G. Abercrombie
Attorney, Agent, or Firm—Julian W. Dority

[57] ABSTRACT

A bird cutting plant comprises an endless conveyer (1) with equidistantly spaced apart bird suspension means (3) from which the birds are suspended upside down for transport through at least one cutting station (II–V). Each suspension means (3) includes two yokes (8) secured to the conveyer (1) and adapted to receive the birds' lower legs, the connecting line of said yokes extending transversely of the direction of movement of the conveyer, and the spacing between said yokes along said connecting line being sufficient to make said yokes hold the lower legs of a bird suspended in this manner stretched apart, but at the same time hold the bird freely swingable, in the conveying direction, on the distal enlarged end portions of the lower legs. Said yokes (8) include guide means (9–12) adapted to guide the cut bird parts out of the yokes when subjected to a force acting against the direction of the force of gravity. The cutting stations are provided with cutting means adapted to cut the birds in symmetrically specular disposition in a plane including the conveying direction, at least said one cutting station being adapted to bipartition the bird before the bird's body and legs are cut at any subsequent stations.

7 Claims, 12 Drawing Figures

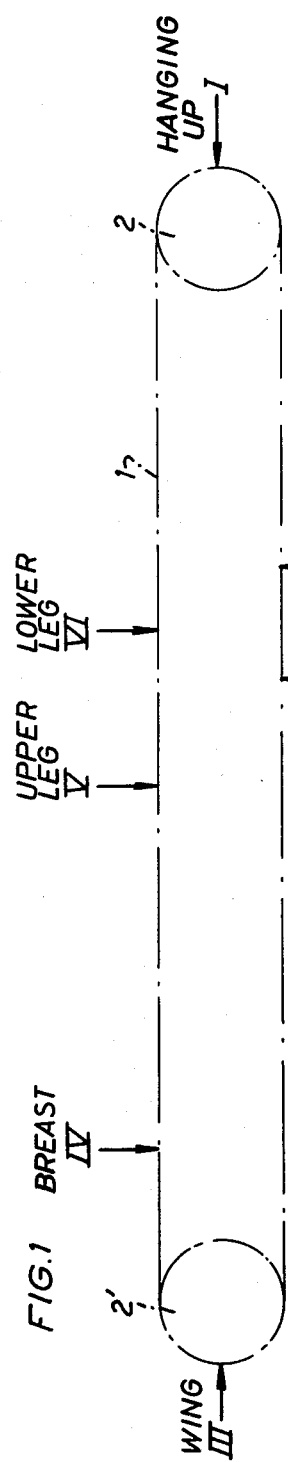
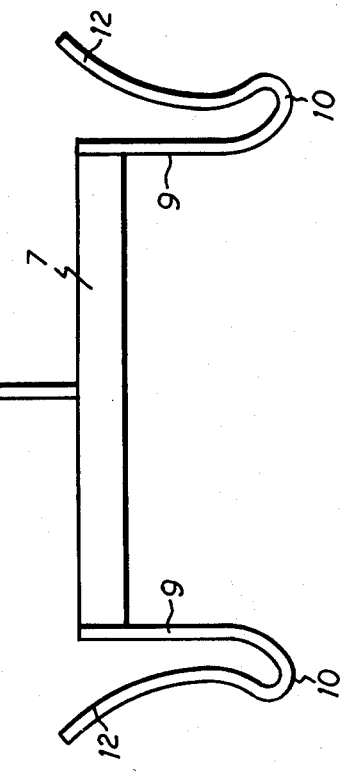
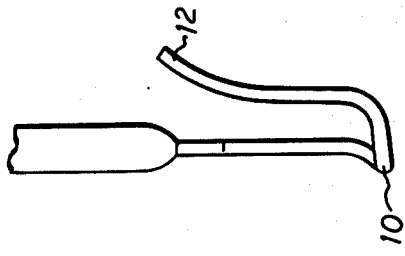

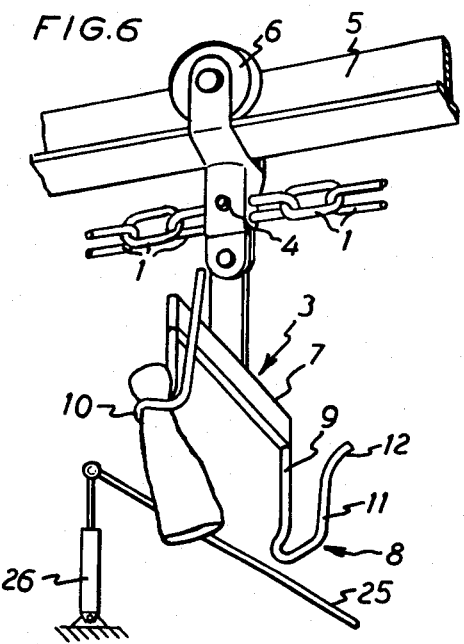

BIRD CUTTING PLANT

The present invention relates to a bird cutting plant.

Some known bird cutting plants comprise an endless conveyer from which the birds to be cut are suspended for transport to one or more cutting stations where the birds are cut up by manual labour. The birds are suspended from the conveyer with their backs or breasts facing outwardly from the conveyer, and the workers are facing these parts of the birds.

Also known are automatic cutting machines in which cutting means substantially continuously cut up a bird introduced into the machine by a conveyer so that mixed bird parts are obtained after the cutting operation, and this necessitates a subsequent sorting operation which is especially inconvenient if identical bird parts are to be packed and marketed. Furthermore, these known machines are of a complicated and inflexible construction causing the different cutting operations to be dependent upon one another.

It is an object of the present invention to provide an automatic bird cutting plant producing uniformly cut and automatically sorted bird parts at different locations along the path of motion of a bird conveyer and readily permitting variation of the bird cutting operations.

According to the invention, the bird cutting plant comprises an endless conveyer with equidistantly spaced apart bird suspension means from which the birds are suspended upside down for transport through at least one cutting station. Each suspension means includes two yokes secured to the conveyer and adapted to receive the birds' lower legs, the connecting line of said yokes extending transversely of the direction of movement of the conveyer, and the spacing between said yokes along said connecting line being sufficient to make said yokes hold the lower legs of a bird suspended in this manner stretched apart, but at the same time hold the bird freely swingable, in the conveying direction, on the distal enlarged end portions of the lower legs, said yokes including guide means adapted to guide the cut bird parts out of the yokes only when subjected to a force acting against the direction of the force of gravity. The cutting stations are provided with cutting means adapted to cut the birds in symmetrically specular disposition in a plane including the conveying direction. At least said one cutting station is adapted to bipartition the bird before the bird's body and legs are cut at any subsequent cutting stations.

The invention will be described in more detail in the following, with reference to the accompanying drawings which show a chicken cutting plant and in which FIG. 1 is a top plan view showing an endless conveyer with cutting stations.

FIGS. 2A and 2B are front and side views, respectively, showing the suspension means according to the invention.

Figure 4A:
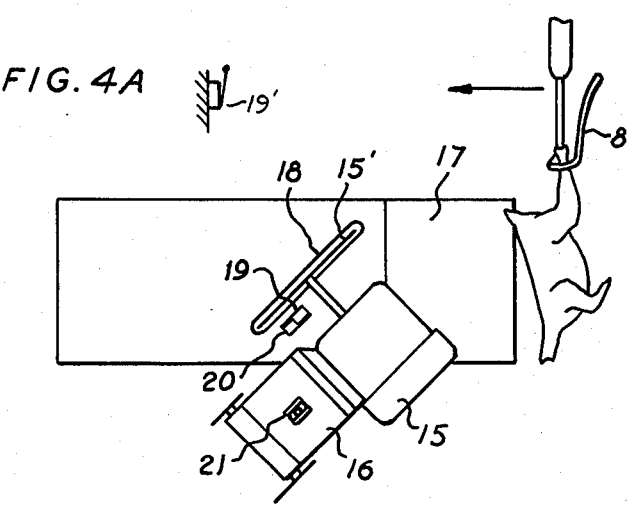
Figure 4B:
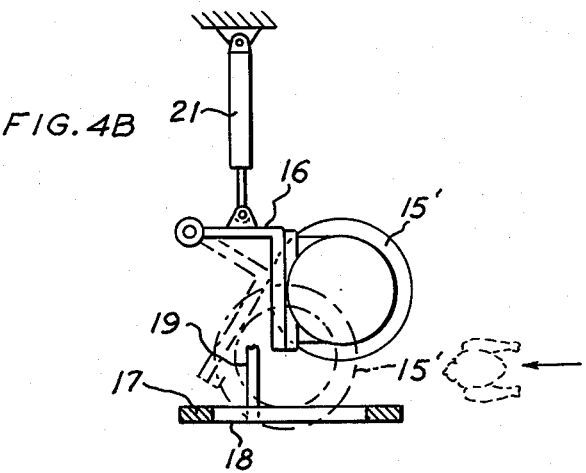
Figure 4C:
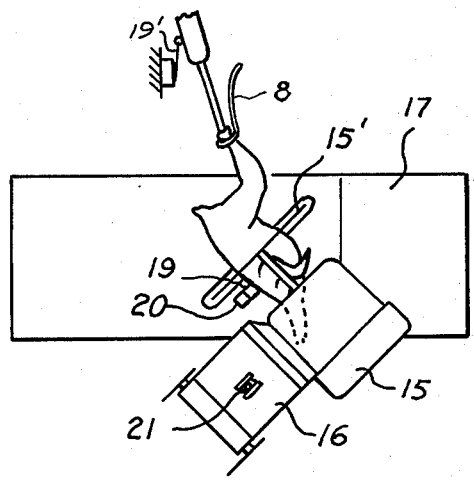

FIGS. 4A, 4B, and 4C show a breast cutting station.

Figure 5A:
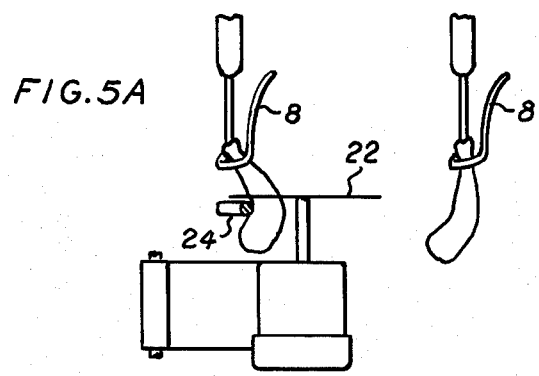
Figure 5B:
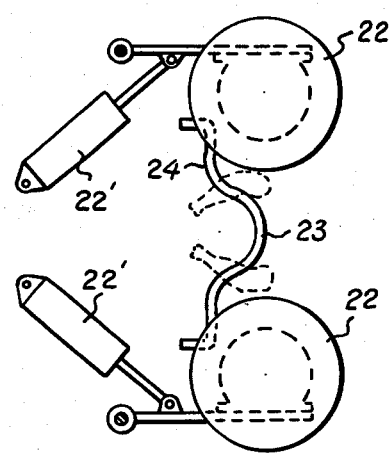
Figure 5C:
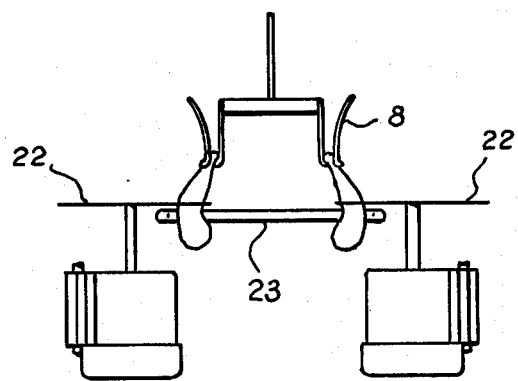

FIGS. 5A, 5B and 5C show a leg cutting station.

FIG. 6 shows a leg lift-off station.

FIG. 1 shows an endless chain 1 having a drive pulley 2 and a guide pulley 2' for driving bird suspension means 3 equidistantly secured to the chain, from a suspension station I to a lift-off station VI, via intermediate stations II-V. These stations will be described in more detail in the following.

Figure 3A:
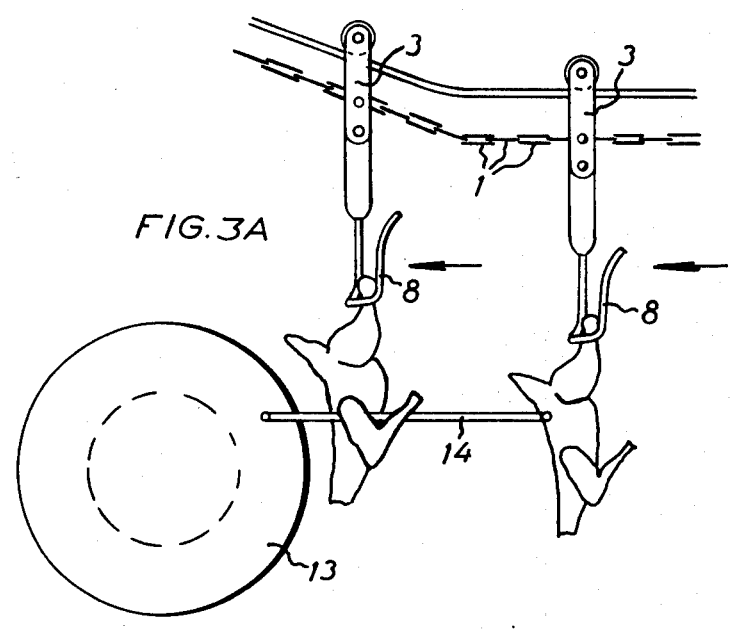
FIGS. 3A and 3B show a chicken bipartitioning station.
Figure 3B:
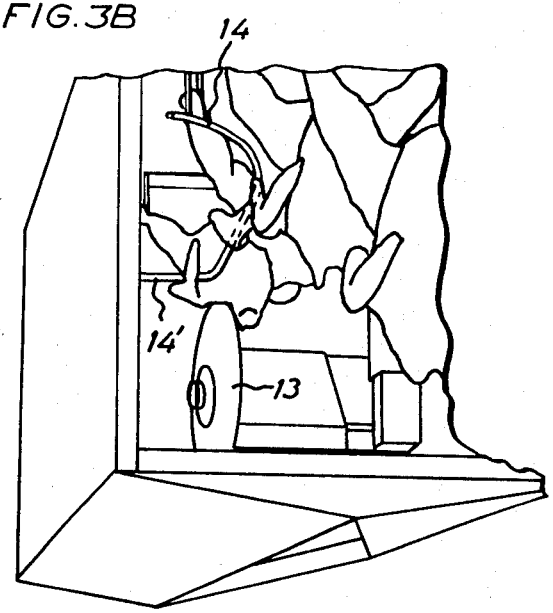

The suspension means 3 (best shown in FIGS. 2, 3 and 6) are essentially rigidly secured to the chain 1 by means of a pin 4 and are guided in their path of motion on an overlying frame 5 by means of rollers 6 connected to said suspension means. The suspension means include a bar 7 located underneath the chain and positioned at right angles to the path of motion of said chain (or the chain itself). Secured to the ends of said bar is one leg 9 of an approximately U-shaped yoke 8. In this embodiment, the plane of the U is at approximately 45° relative to the part of the chain 1 which lies behind it in the direction of movement, and the bottom part 10 of the U is bent forwardly through approximately 90° from the said plane. The other free leg 11 of the U-shaped yoke has an outwardly bent part 12 forming a guide for the lower leg of the chicken when the chicken, from which the metatarsal bones and the foot knuckles have been removed, is hung up on the suspension means of station I. The yokes 8 are mirror-inverted relative to one another in a vertical plane passing therebetween and including the direction of movement of the conveyer. The spacing between the yokes is such that the chicken, when suspended from the yokes with its lower legs, is stretched in its transverse direction at its upper legs when the narrowest parts of the lower legs adjacent the free joints of the enlarged lower legs are inserted in the yoke part 10 which is bent through 90°. A suitable spacing is between about 190 mm and 250 mm, depending upon the size of the chicken. The chicken is now suspended with the said enlarged joints from said parts 10 which are bent through 90° and, because the yoke parts 10 are of adequate size, is capable of swinging in these parts 10 in a plane parallel to the direction of movement of the conveyer, whereby also such bird parts as remain on the yokes after the cutting operations are freely suspended and capable of swinging on the yoke parts 10.

The cutting stations I-V will now be described in detail.

At the station I, located in the right-hand reversing position of the chain conveyer 1, as shown in the drawing, the chicken is hung up on the suspension means in the manner described above which in this embodiment is done manually so that the back of the chicken is facing in the direction of movement of the suspension means.

At the station II (FIGS. 3A, 3B) the chicken is bipartitioned, beginning at the back, in its longitudinal plane of symmetry by a first cutting means which includes a power operated circular saw which is mounted in a frame and whose blade 13 is parallel to the direction of movement of the suspension means. For correctly positioning the chicken for this bipartitioning operation, a guiding device is provided which consists of two fixedly mounted rails 14 converging towards one another in the direction of movement. Immediately ahead of said guiding device, the path of motion has an upward slope which terminates at the rear end of the guide rails 14 where these rails have a portion 14' positioned transversely relative to the direction of movement. Because of the slope, and because the spacing between the guide rails is so chosen that it corresponds, at an intermediate point of the length of the guide rails, to the spacing between the wing tips of the chicken when the wings are close to the body of the chicken, the bastard wing tips of the chicken will safely grasp underneath the guide rails, and during the continued movement of the suspension means the upper arm parts of the wing will each grasp from behind the rear transverse part 14' of the guide rails, which part acts as a holding-up means during bipartitioning. The saw is so positioned that it begins the bipartitioning operation when the chicken, due to the above-mentioned engagement of the rear transvere part 14' of the guide rail by the wings, during the forward movement has swung slightly out of the suspension position, i.e. when it has assumed a position in which the legs are slightly ahead of the body in the direction of movement. After bipartitioning, the chicken halves are suspended in spaced apart relationship each in one yoke 8 of the suspension means 3.

At the station IV (FIGS. 4A, 4B, 4C) the breast portion and the wing are severed from the respective chicken half by a second cutting means which includes a power operated circular saw 15 in a conventional plane separating the upper leg from the breastbone and the pelvic bone. The saw has an inclined blade 15' and is pivotally mounted in a frame so that the blade can move in its inclined plane from an inactive position outside the path of motion into a cutting position in which the saw blade enters a slot 18 formed in a fixedly mounted chicken holding-up plate 17, after the chicken half has been cut in the said plane from its outer side to its inner side. For orienting and holding-up the chicken part during the cutting operation, a horizontal bar 19 extends transversely of the direction of movement from an upstream slot 20 in the plate 17 and is movable in said slot 20 for adjustment at different levels. When the chicken half reaches the bar 19, it is slightly swung by said bar until the desired cutting plane coincides with the plane of the saw blade 15. The coincidence is accomplished by means of a microswitch 19' which is disposed on the frame 5 and which, upon contact with the suspension means, activates a hydraulic cylinder 21 for swinging the saw into the cutting position. The chicken half which is supported by the yoke positioned on the inner side of the conveyer run is cut in similar manner by means of a corresponding saw and a holding-up plate in an inward-outward direction. After cutting, the breast portion and the wing are allowed to drop into a collecting pocket.

At the station V (FIGS. 5A and 5B, 5C) the upper leg of the chicken is severed from the lower leg by means of a power operated circular saw blade 22 which is pivotally mounted in a frame for movement in a horizontal plane along an arcuate path of motion. A hydraulic cylinder 22' is provided for this movement. The chicken part which is conveyed to this station from station IV and which consists of lower and upper legs, is cut along a plane between the upper leg and the lower leg. For horizontal adjustment of this plane which, as will appear from FIG. 6, is of necessity inclined in the suspended position of the chicken part, a guide rail 23 is provided which is generally U-shaped and has its bottom facing in the direction of movement of the suspension means. Each of the chicken parts suspended from the suspension means is guided by said rail 23 in an outwardly directed oblique movement to a bight 24 provided in the guide rail 23, and during this outward movement the chicken parts are slightly rotated about their longitudinal axis so that they will engage the bight with the fold between the upper and the lower legs. As a result of this engagement, there is imparted to the chicken parts, during the continued movement of the suspension means, a swinging movement in the conveying direction which continues until the said plane of the desired cut lies horizontally. The horizontal adjustment is accomplished by means of a microswitch (not shown) which is provided on the frame and which, when activated by the suspension means 3, activates a hydraulic cylinder 22 for advancing a circular saw, the blade of which lies immediately above the guide rail 23, to the respective chicken part on the suspension means so that the upper leg will be separated from the lower leg. The upper legs are collected in a collecting pocket.

At the station VI (FIG. 6), the lower legs arriving from the station V and still suspended from the suspension means, are separated therefrom by means of a bar 25 which is positioned transversely of the direction of movement of the suspension means and is activated for upward movment via a hydraulic cylinder 26 when a microswitch affixed to the frame 5 contacts the suspension means 3. During its upward movement, the bar engages the front side of the legs (as seen in the direction of movement of the suspension means 3) and urges the legs out of the bent yoke parts 10 in an upward direction and gradually forces them out of the yokes 8. The legs are allowed to drop into a collecting pocket.

It is understood that the saws and the bar 25 at the above-mentioned stations IV-VI are returned by means of the hydraulic cylinders into their non-cutting positions of rest to effect a new cutting operation when the next suspension means comes into contact with the respective microswitch.

A station IV' may be provided with saws corresponding to the saws of station IV and with a lifter bar corresponding to the lifter bar 25 of station VI in order to sever the breast and the wing from the upper and lower legs and for lifting both leg parts from the suspension means, whereby the chicken will be cut into four parts. Optionally, only one of the saws of this station can be activated so that only the corresponding chicken half is cut into the said four parts and is lifted off, while the other chicken part is allowed to pass through the above-mentioned cutting operations to station V and the lifting-off operation at station VI. This arrangement provides for greater flexibility of the chicken cutting plant for different fine-cutting operations.

If desired, a wing severing station III may be provided at the left-hand reversing position of the conveyer 1.

We claim:

1. Bird cutting apparatus for cutting and separating parts of a bird in a bird processing plant of the type including an endless conveyor with equidistantly spaced apart bird suspension means from which the birds are suspended upside down for transport through at least one cutting station, said apparatus comprising:

each said suspension means including two generally U-shaped yokes secured to said conveyor;

said U-shaped yokes having generally U-shaped openings for receiving the lower legs of the bird, said U-shaped yokes generally facing one another generally transverse to the direction of conveyance;

said suspension means receiving the bird's lower legs with the connecting line of the yokes extending transversely of the direction of movement of the conveyor;

said yokes of said suspension means being spaced apart along said connecting line sufficiently so that said yokes hold the lower legs of a bird suspended in this manner stretched apart;

said spaced apart yokes holding the lower legs of a bird suspended to allow the bird to be freely swingable in the conveying direction while said lower legs are stretched apart and said suspension means is secured to said conveyor;

each said yoke including downwardly extending legs terminating in a forwardly bent bottom part;

guide means included in each said yoke extending upwardly and outwardly from said bottom part of said yoke for holding a distal enlarged end portion of the lower leg of said bird and for guiding the cut bird parts out of the yokes when subjected to a force opposite the force of gravity;

a plurality of cutting stations each including cutting means for cutting the birds in separated bird parts.

2. The apparatus of claim 1 wherein said bottom part of each said yoke is bent through approximately ninety degrees from the plane of the U-shaped legs in the said direction of movement to form a part of said guide means.

3. A bird cutting apparatus for cutting and separating parts of a bird in a bird processing plant of the type which includes an endless conveyor with spaced apart bird suspension means from which the bird is suspended upside-down for transport to at least one cutting station, said apparatus comprising:

each said suspension means including shackle means connected to said conveyor having a pair of spaced apart yokes by which the legs of said bird are held with the bird being suspended upside-down;

a bi-partitioning station disposed adjacent said conveyor including a guide means carried adjacent said conveyor for positioning a bird suspended by said shackle means so that said bird may be cut vertically into two parts;

a bi-partitioning cutting blade for performing a vertical cut to bi-partition said bird suspended on said shackle means into two separated parts;

a bird quartering station disposed adjacent said conveyor for cutting a breast portion of said bird suspended by said shackle means to sever said breast portion from said bird;

said quartering station including a tilt bar means engaging said bird suspended from said shackle means and orienting said bird at an inclination for cutting of said breast portion; and a quartering cutting blade oriented at an inclination to cut said breast portion from said bird held by said tilt bar means.

4. The apparatus of claim 3 including;

a leg cutting station disposed adjacent said conveyor including a leg cutting blade means for severing upper and lower leg portions of said leg; and guide means guiding said bird legs held by said shackle means for engagement with said leg cutting blade means for cutting and severing said upper and lower legs suspended on said shackle means.

5. The apparatus of claim 3 wherein said bi-partitioning station blade includes a circular saw and said guide means includes parallel spaced guide rails for guiding said bird to said saw and holding said bird for bi-partitioning.

6. The apparatus of claim 3 wherein said bird is suspended by said shackle means and conveyed through said cutting stations with the back of said bird facing forward.

7. The apparatus of claim 3 wherein said bi-partitioning station is disposed first along said conveyor as said bird is conveyed by said shackle means, said quartering station being disposed second along said conveyor after said bi-partitioning station, and said leg cutting station is located downstream of said quartering station along said conveyor.

* * * * *